Feb. 17, 1931.   P. C. WEGO   1,793,346
PROTECTED BEARING FOR CONVEYER ROLLERS
Filed July 21, 1927
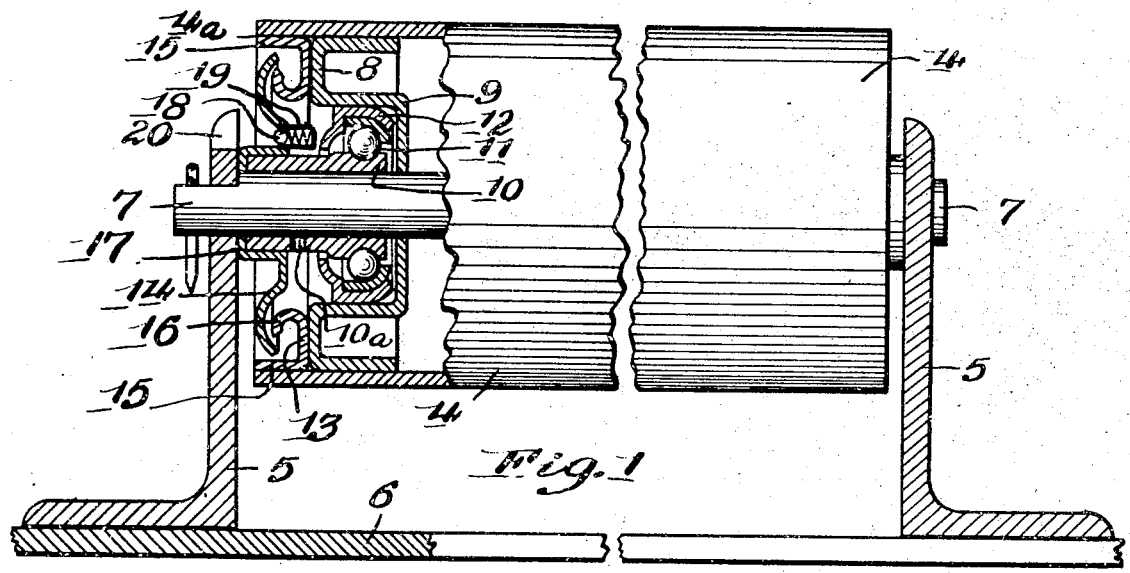
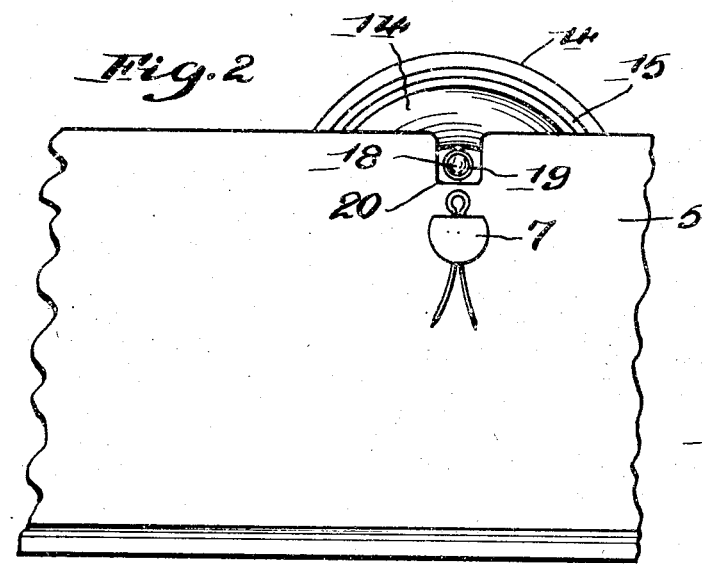
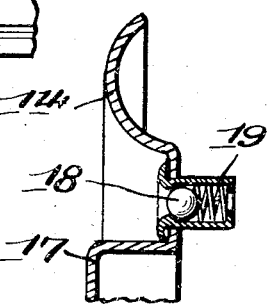
Inventor
Peter C. Wego
By Stryker & Stryker
Attorney

UNITED STATES PATENT OFFICE

PETER C. WEGO, OF ST. PAUL, MINNESOTA, ASSIGNOR TO STANDARD CONVEYOR COMPANY, OF NORTH ST. PAUL, MINNESOTA, A CORPORATION OF MINNESOTA

PROTECTED BEARING FOR CONVEYER ROLLERS

Application filed July 21, 1927. Serial No. 207,414.

It is the object of this invention to provide a conveyer roller or like revoluble body with novel and efficient means for guarding the bearings against injurious substances, such as abrasive and corrosive matter, which is apt to reach the bearings in the absence of efficient protective means.

The invention will be best understood by reference to the accompanying drawings in which Figure 1 is a central, vertical section through my device showing its relation to a roller having a support of common type; Fig. 2 is an end view of the roller, together with the support; Fig. 3 is a detail showing the outer face of the protective cap and Fig. 4 is an enlarged section taken on the line 4—4 of Fig. 3.

In the drawings I have illustrated my invention as applied to a roller having a tubular body 4 which is supported at its ends upon angle bars or rails 5, said rails being connected in rigid, spaced relation by transverse members 6. Extending axially through the roller body 4 and supported at its ends by the rails 5 is a rod 7. Bearings of the anti-friction, rolling type are provided in each end of the body 4 upon the rod 7. These bearings are entirely enclosed within the tubular body 4. Each end of the body 4 has a closure 8, which is formed with a bearing cup 9. The closure and cup 9 are offset inward from the end 4a of the body 4, being rigidly secured therein in any suitable or well known manner, as by crimping or indenting the body 4.

Extending axially into the cup 9 and supported upon the rod 7 is a bearing sleeve 10, having an annular race for anti-friction balls 11 near its inner end. The outer end of the sleeve 10 extends adjacent to the rail 5 to transmit end thrust thereto. The balls 11 or rolling members of the bearings are confined within a suitable cage 12 which affords an outer bearing for the balls 11. I prefer to form the sleeve 10 so as to fit closely the rod 7, but not tight enough to prevent gradual turning or "creeping" of the sleeve about the rod 7. Grease for sealing the joint between the rod 7 and sleeve 10 is conducted from the bearing recess through a passageway 10a in said sleeve.

To close the main opening into the bearing recess above described, I provide a ring 13 and a cap 14. The inner face of the ring 13 abuts against the closure 8, while a flange 15 on its outer periphery fits snugly within the cylindrical body 4, being rigidly connected to said body by crimping the end 4a inward upon the flange 15. At its inner periphery, the ring 13 has an annular flange 16, which is bent longitudinally outward, relative to the axis of the roller, and then radially outward toward the inner surface of the tubular body 4, thus forming an annular receptacle adapted to receive lubricant and to retain the same in sealing relation to the outer periphery of the cap 14. This cap 14 is rigidly secured upon the outer end of the sleeve 10, being formed with a hub 17, engaging said end. From the hub 17, the cap 14 extends outward and is formed with a dish shaped periphery arranged to direct grease into the receptacle formed by the flange 16. The outer rim of the cap 14 is located in close proximity to the flange 16 of the ring 13 and also to the inner surface of the flange 15. Thus, the rim of the cap 14 extends into the narrow, annular opening into the receptacle formed by the flange 16.

To facilitate lubricating the bearing, the cap 14 is perforated near the sleeve 10. This perforation is normally closed by a spring pressed ball 18, mounted in a small casing 19 of common type (see Fig. 4). To allow access to the hole in the cap 14, the rail 5 is cut away at 20 in position to register with the ball closure 18.

It will now be understood that the anti-friction balls 11 rotate between the sleeve 10 and cage 12 within the cup 9 and that the ring 13 is fixed within the tubular body while the closure cap 14 is secured to the axial support or sleeve 10. Lubricant, preferably grease, is forced into the bearing through the opening 20 and hole in the cap 14, past the ball closure 18. The cap 14 directs a quantity of the grease into the annular receptacle formed by the ring 13 and flange 16, and when said receptacle is filled, all openings into the bearing are sealed against the entry of foreign matter, including injurious gases or liquids. Any solid matter, which might work into the bearing in the absence of the protection means, is deflected by the cap 14 or caught in the flange 16 and prevented from entering. I have found that my protective means are highly efficient in preserving the bearings and may be manufactured at small cost. The ring 13 and cap 14 are simple sheet metal stampings.

Having described my invention what I claim as new and desire to protect by Letters Patent is:

1. In a device of the class described, the combination with a revoluble body having a bearing recess in an end and an axial support in said recess, an anti-friction bearing between said body and support in said recess and a closure for said bearing recesss comprising a ring offset inward from the end of said body, an outwardly projecting annular flange formed on the inner periphery of said ring, and a circular cap secured to said support and having its outer rim between the inner periphery of said body and outer periphery of said flange.

2. In a device of the class described, the combination with a revoluble body having a bearing recess in an end and an axial support in said recess, an anti-friction bearing between said body and support in said recess and a closure for said bearing recess comprising a ring offset inward from the end of said body and rigidly mounted in said recess, an outwardly projecting annular flange on the inner periphery of said ring, forming an annular receptacle for lubricant adjacent to the inner periphery of said body and a circular cap mounted on said support and having its outer rim between the inner periphery of said body and outer periphery of said flange.

3. In a device of the class described, the combination with a tubular, revoluble body having a bearing recess in an end and an axial support in said recess, an anti-friction bearing between said body and support in said recess and a closure for sealing said bearing recess comprising a ring offset inward from the end of said body and rigidly mounted in said recess, an outwardly projecting annular flange on the inner periphery of said ring, forming an annular receptacle for lubricant adjacent to the inner periphery of said body, a circular cap mounted on said support and having its outer rim between the inner periphery of said body and outer periphery of said flange, said cap being formed to direct lubricant into said receptacle and means for admitting lubricant to said bearing and to the inner face of said cap.

4. In a device of the class described, the combination with a revoluble body having a bearing recess in an end and an axial support in said recess, a bearing between said body and support in said recess and a closure for said bearing recess comprising a ring offset inward from the end of said body, an outwardly projecting annular flange formed on the inner periphery of said ring, and a circular cap having a sleeve portion fitting snugly about said support and a rim portion integral with the inner extremity of said sleeve portion and projecting radially outward within said bearing recess, the outer periphery of said rim portion projecting beyond the periphery of said flange closely adjacent to the inner periphery of said body.

In testimony whereof, I have hereunto signed my name to this specification.

PETER C. WEGO.